United States Patent [19]

Milewski

[11] Patent Number: 5,091,931
[45] Date of Patent: Feb. 25, 1992

[54] FACSIMILE-TO-SPEECH SYSTEM

[75] Inventor: Allen E. Milewski, Red Bank, N.J.

[73] Assignee: AT&T Bell Laboratories, Murray Hill, N.J.

[21] Appl. No.: 427,410

[22] Filed: Oct. 27, 1989

[51] Int. Cl.$^5$ .......................................... H04M 11/00
[52] U.S. Cl. ...................................... 379/100; 381/52
[58] Field of Search .................. 379/52, 67, 88, 90, 379/96, 100; 381/51, 52; 364/513, 5

[56] References Cited

U.S. PATENT DOCUMENTS

| | | | |
|---|---|---|---|
| 2,500,630 | 3/1950 | Davis et al. | 381/52 |
| 2,615,992 | 10/1952 | Flory et al. | 381/52 |
| 3,059,064 | 10/1962 | Lebell | 381/52 |
| 3,114,980 | 12/1963 | Davis | 381/52 |
| 3,704,345 | 11/1972 | Coker et al. | 381/52 |
| 4,278,838 | 7/1981 | Antonov | 381/52 |
| 4,685,135 | 8/1987 | Lin et al. | 381/52 |
| 4,908,867 | 3/1990 | Silverman | 381/51 |
| 4,996,707 | 2/1991 | O'Malley et al. | 379/100 |

FOREIGN PATENT DOCUMENTS

| | | | |
|---|---|---|---|
| 0239394 | 9/1987 | European Pat. Off. | 381/52 |
| 3615661 | 11/1987 | Fed. Rep. of Germany | 381/51 |
| 8504747 | 10/1985 | World Int. Prop. O. | 381/52 |

OTHER PUBLICATIONS

S. J. Boies et al., "User Interface for Audio Communication System", IBM Technical Disclosure Bulletin, vol. 25, No. 7A, 12/1982, pp. 3371-3377.

P. W. Nye et al., "Sensory Aids for the Blind: A Challenging Problem with Lessons for the Future", Proceedings of IEEE, vol. 58, No. 12, 12/1970, pp. 1878-1898.

Songco et al., "How Computer Talk to the Blind", IEEE Spectrum, May 1980, pp. 34-38.

Blazio, "Total Talk A Computer Terminal for the Blind", Proceedings, John Hopkins . . . Personal Computing to Aid the Handicapped, Oct. 1981.

Voice News, vol. 8, No. 7, Jul. 1988.

Primary Examiner—James L. Dwyer
Assistant Examiner—Wing F. Chan
Attorney, Agent, or Firm—Ronald D. Slusky

[57] ABSTRACT

Written material is read at low cost by a computer-based system which is designed to receive via a telephone line a facsimile of the written material submitted by a system user. Once the facsimile is received, the system performs an optical character recognition (OCR) process thereon. The text thus identified by the OCR process is converted to intelligent speech using a speech synthesizer. The synthesized speech is communicated back to the system user either over the already established telephone connection or in a subsequent call.

23 Claims, 3 Drawing Sheets

FACSIMILE-TO-SPEECH SYSTEM

TECHNICAL FIELD

The present invention relates to the transmission of image and voice over a telephone network.

BACKGROUND OF THE INVENTION

It is a common and oft-repeated circumstance where visually-impaired persons receive written text which needs to be read to them. Under such a circumstance, these persons seek to satisfy their needs by means of one of the following typical ways.

The visually-impaired persons may rely on their co-workers and family members to read to them. In doing so, these persons disadvantageously forego the privacy associated with the written communication. This method also potentially creates an undue burden on the co-workers or even the family members if they are bothered often enough to read written text which is particularly voluminous. In addition, in spite of this method, the visually-impaired persons cannot have others read the written text immediately to them when situated alone.

The visually-impaired persons may also hire human readers to read to them. Although this solves the above-identified problem of the potential undue burden on others, the disadvantage of the aforementioned lack of privacy remains. Furthermore, even relying on this method, the visually-impaired persons cannot normally afford to have the text read to them immediately after the receipt thereof. This stems from the fact that such a reader service is expensive and certainly not economical to employ it on a full time basis while it is only required sporadically, which is mostly the case. Thus generally, the readers are hired for an hour or two at a time, and written material is saved and accumulated for their service.

Moreover, the visually-impaired persons may resort to commercial devices which employ conventional optical character recognition (OCR) and speech synthesizing techniques. These devices manage to translate the image of text to the corresponding intelligent speech. One category of these devices is comprised of "stand-alone" OCR machines which operate without the aid of additional equipment. In general, such machines are undesirably expensive.

There are commercially available less expensive OCR cards and scanners which can be used as adjuncts to personal computer (PC) systems for performing similar image-to-speech translation. However, not to mention the substantial financial investment in the PCs themselves, the utilization of these cards requires the visually-impaired persons to have some non-trivial training in the use of the PCs. Such a training, often times, creates undesirable hardship to these persons due to their visually disadvantaged condition.

In view of the forgoing, it is desirable for visually-impaired persons to have access to a system that provides a reading service which is responsive, economical, easy to use and substantially private.

SUMMARY OF THE INVENTION

The present invention overcomes the limitations of the prior art by providing apparatus which responds to telephone calls from individuals who want written material read to them. In accordance with the present invention, a facsimile of the written material is sent to the apparatus via a telephone network. Upon the receipt thereof, the apparatus scans the facsimile to identify the symbols thereon. The symbols thus identified are then converted into synthesized speech and transmitted back through the telephone network.

In particular, the inventive apparatus can be accessed via a conventional dial-up connection using a telephone network. The apparatus includes first circuitry which receives transmitted facsimiles, second circuitry which performs an optical character recognition process on the received facsimiles, and a speech synthesizer which converts the identified symbols therefrom into an intelligent speech. This speech represents the content of the transmitted facsimiles and is communicated back to the user.

DETAILED DESCRIPTION

Figure 1:
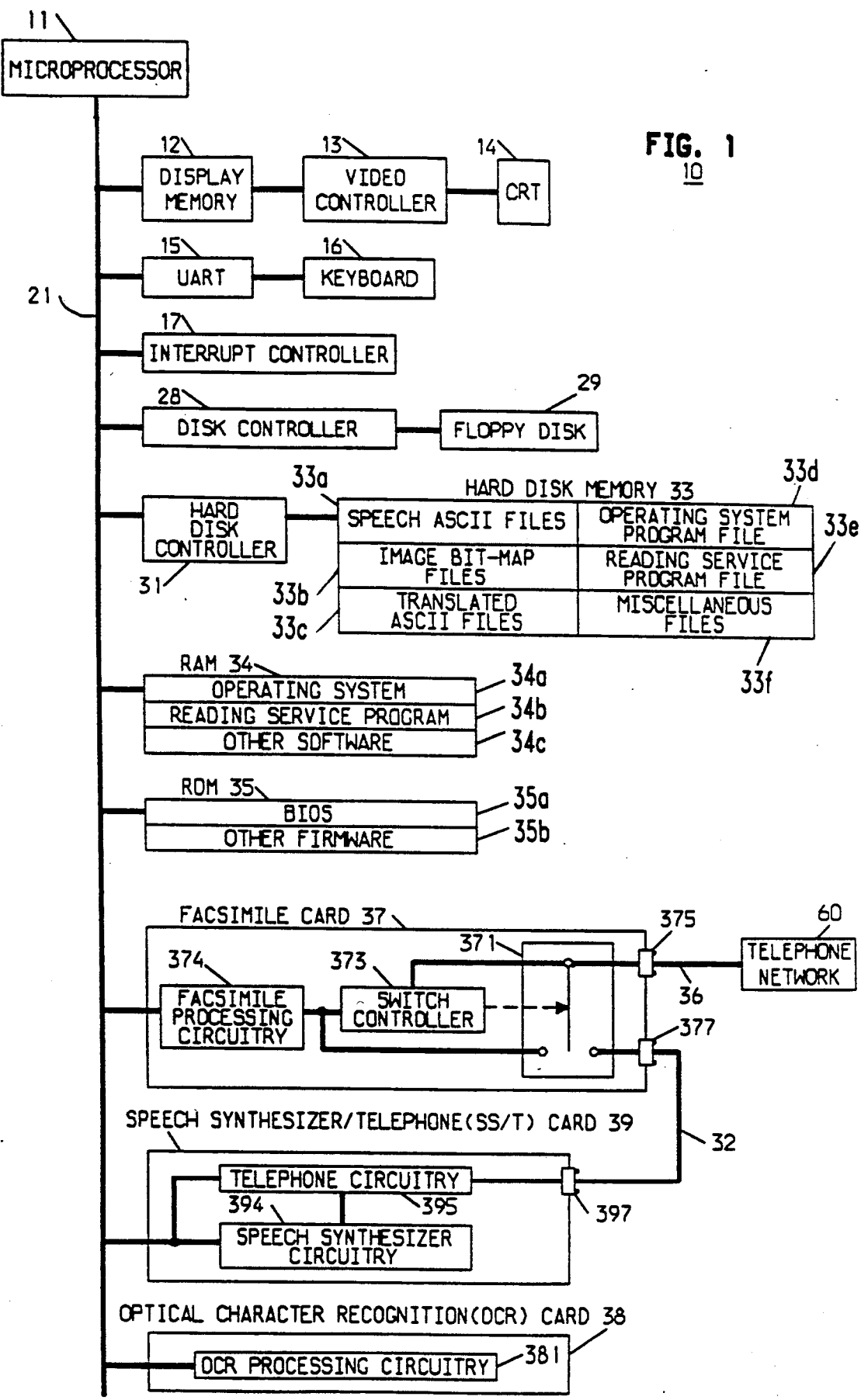
FIG. 1 is a block diagram of a microcomputer system embodying the principles of the present invention.

System 10 of FIG. 1 utilizes a standard microcomputer and commercially available special-purpose circuit cards. Individuals, in particular, visually-impaired persons, can call the system and submit thereto facsimiles of written text. Based on the received facsimile, system 10 reads the text back to the callers over the telephone and thus performs a facsimile reading service.

The system is illustratively based on an AT&T Model PC 6300 personal computer, at the heart of which is microprocessor 11 having address, data and control buses. These buses are numerically denoted as 21. Connected to bus 21 is display memory 12 whose contents are used by video controller 13 to generate video signals for CRT 14; universal asynchronous receiver transmitter (UART) 15, which serves as a serial interface between microprocessor 11 and keyboard 16; an interrupt controller 17, to which hardware interrupt leads (not shown) extend, inter alia, from UART 15; floppy disk controller 28, which serves as an interface between microprocessor 11 and floppy disk memory 29, and hard disk controller 31, which serves as an interface between microprocessor 11 and hard disk memory 33. The latter holds, inter alia, speech ASCII files 33a (for predetermined messages), image bit-map files 33b and translated ASCII files 33c; a copy of the workstation's operating system 33d—illustratively the MS-DOS ® operating system; a copy of an application module, herein referred to as "reading service program" 33e, which, when executed, controls the system hardware in accordance with the invention; and a number of miscellaneous files indicated at 33f.

Also connected to bus 21 is random access memory (RAM) 34 and read-only memory (ROM) 35. When the system is in operation, RAM 34 holds the executed copies of a) the operating system, indicated as 34a, b) reading service program, indicated as 34b, and c) other software not here relevant, indicated as 34c. ROM 35 contains the conventional Basic Input/Output System (BIOS) 35a as well as other firmware 35b.

Also connected to bus 21 are three circuit cards that play a central role in implementing the invention. One of these is facsimile card 37 which may be, for example, the FAXCON-20 facsimile communication board available from AT&T. Facsimile card 37 includes connectors 375 and 377, switch 371, switch controller 373 and facsimile processing circuitry 374, the latter comprising all the other circuitry on the card. Among the capabilities of facsimile card 37 relevant here are the abilities a) to handshake and communicate with a caller's facsimile machine and b) to convert received facsimile images therefrom into image data bits using standard facsimile formats and protocols.

Another one of the aforementioned circuit cards is speech synthesizer/telephone (SS/T) card 39, illustratively, a card marketed by Speech Plus ® Incorporated under the model Calltext TM 5000. As called out in the drawing, card 39 is comprised of connector 397, speech synthesizer circuitry 394 and telephone circuitry 395.

SS/T card 39 has a number of capabilities. Among those relevant here are the abilities a) to pick up an incoming call from a telephone network, recognize touch tone inputs and report the identity of the digits or signs represented thereby onto bus 21 and b) to synthesize speech based on the digitally stored versions thereof and output line signals representing the synthesized speech at connector 397.

The last circuit card that is central to the implementation of the present invention is optical character recognition (OCR) card 38. Illustratively, an OCR card of model S/AT manufactured by Calera Corporation is used in the present embodiment. Card 38 comprises OCR processing circuitry 381 which is capable of, inter alia, a) receiving facsimile data which is in a bit-map format and b) converting the identified alphabets and non-alphabets into the corresponding ASCII characters onto bus 21.

Circuit cards 37 and 39 are interconnected by way of a jumper cable 32 which connects facsimile card connector 377 to SS/T card connector 397. In addition, a conventional telephone line 36 connects facsimile card connector 375 to telephone network 60. When the system is in an idle state, switch 371 within card 37 is initially set to connect connector 375 to connector 377. That is, prior to the receipt of any telephone call, telephone line 36 is directly connected to card 39 through switch 371.

Figure 2:
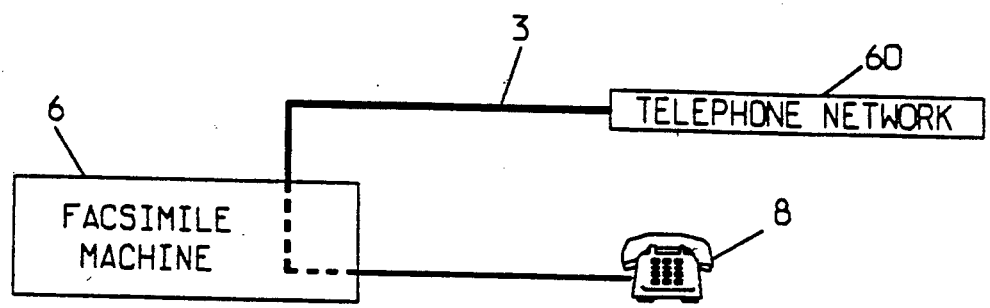
FIG. 2 is a block diagram of a standard telephone/facsimile station from which the text of written material is communicated to the system of FIG. 1 and to which the recitation of the text is communicated from the system.
Figure 3:
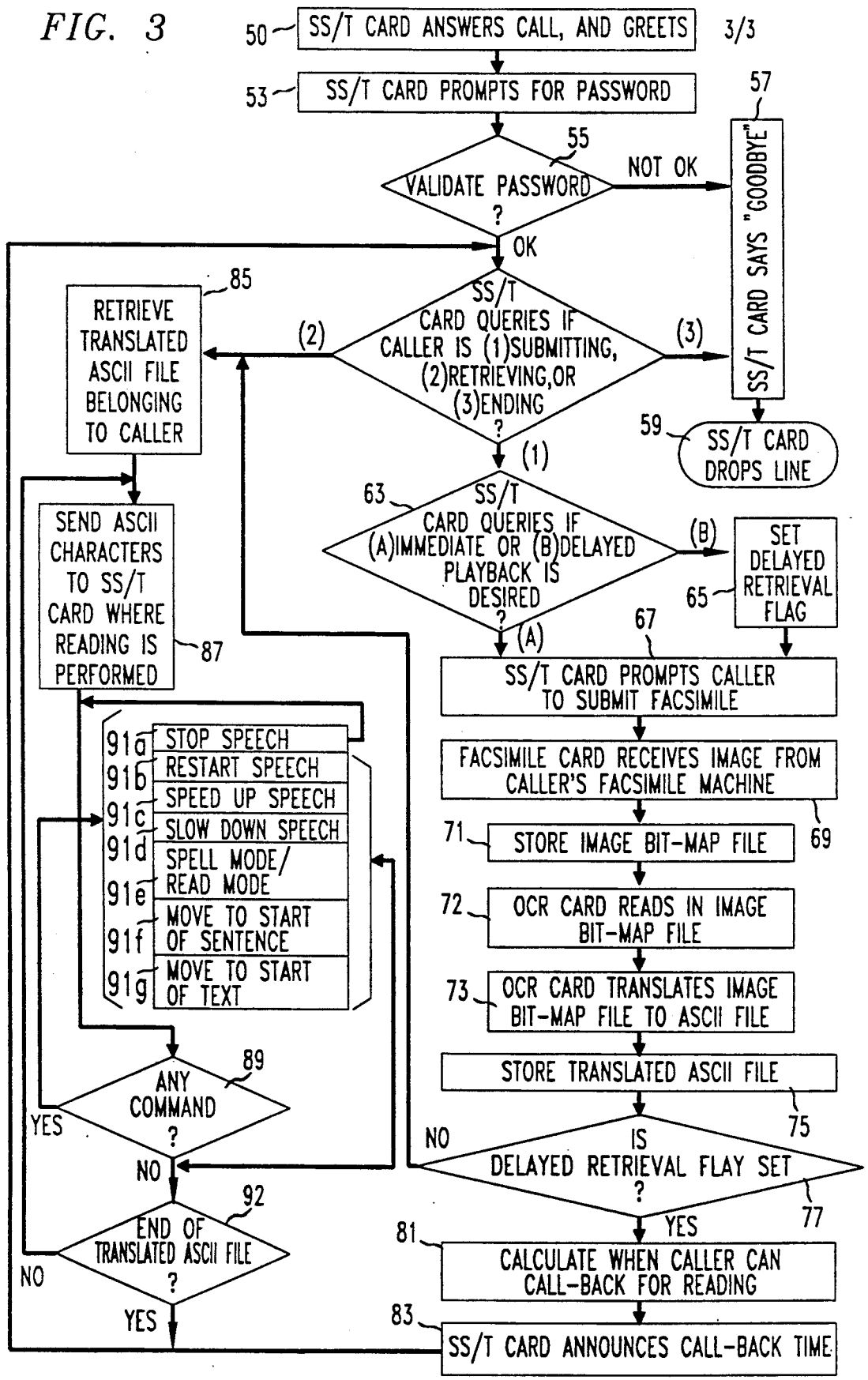
FIG. 3 is a flowchart of the processing performed by software within the system of FIG. 1.

Turning now to FIGS. 2 and 3, the facsimile/telephone station depicted in FIG. 2 is comprised of a standard facsimile machine 6 having connected thereto a standard touch-tone telephone 8 and a conventional telephone line 3 which extends into telephone network 60. When a person at telephone 8 wishes to be availed of the present reading service provided by system 10 of FIG. 1, he/she dials the telephone number associated with telephone line 36. Having been instructed by reading service program 34b, which is now in control of the system, to be monitoring the incoming line, telephone circuitry 395 within SS/T card 39 recognizes the ringing voltage and, as indicated at 50 of FIG. 3, answers the call.

Reading service program 34b at this point operates speech synthesizer circuitry 394 within card 39 to deliver a sequence of messages to the caller. In each case, the message is delivered by instructing the operating system 34a to retrieve one of speech ASCII files 33a from hard disk 33 and route the file via bus 21 to speech synthesizer circuitry 394. The latter converts the content of this file into synthesized speech. Telephone circuitry 395 thereupon generates a line signal of standard format which represents the synthesized speech and transmits the signal to the caller via telephone line 36.

System 10 is illustratively used by the XYZ Corporation to provide the present facsimile reading service, and, as further indicated at 50, the first message is a greeting, illustratively the greeting "Welcome to the XYZ Corporation facsimile reading service." This message is immediately followed by a second message, again delivered to speech synthesizer circuitry 394 via the above-outlined mechanism. As indicated at 53, this second message for a security reason requests callers to enter their respective user identifications and passwords, which may be assigned beforehand to service users when they join this service. Illustratively, the identifications and passwords are made up of sequences of numbers and alphabets, each of which is associated, in a conventional manner, with a key on a standard touch-tone telephone. The message may be, "Please key in your user identification and password on your touch-tone telephone." The program now instructs telephone circuitry 395 to be receptive to an answering touch-tone input from the caller. Circuitry 395, being capable of recognizing touch tone inputs, supplies reading service program 34b with information of the caller's response. As indicated at 55, after receiving the information, the program checks it against every pre-entered personal record comprised of a user identification and the associated password in a logon file. The latter, which is one of the miscellaneous files at 33f, contains such personal records of all service users. Thus, the program at step 55 validates the caller's identification if it finds a match of the information in the logon file. Otherwise, a message such as "Goodbye" is delivered at step 57 to speech synthesizer circuitry 394 to indicate to the caller his/her invalid entry. A request for disconnecting the call is then initiated from the program at step 59 to telephone call circuitry 395. In response to the request, the latter transmits an on-hook signal to the telephone network so as to terminate the call.

Where the caller's identification has been validated, the program proceeds to step 61 at which the caller can specify the service desired. Illustratively, the program offers three options to the caller at this point. The selection of one of these options involves a typical query and response as follows:

READING SERVICE: Touch "1" for submitting facsimiles to be read; touch "2" for retrieval, i.e., reading of previously submitted facsimile; and touch "3" for ending this service.

USER: [Enters '1'].

In this example, the caller chooses to submit facsimiles needed to be read. Otherwise, had the caller entered "2", the program would retrieve from the hard disk the prior record of submitted facsimile and read the content thereof to the caller. This retrieval is accomplished by a routine starting at step 85 and the routine is described in full detail hereinbelow. Had the caller entered "3", the program would carry out the aforementioned routine of step 57, followed by step 59 to terminate the call. This last option is particularly useful after going through the service at least once.

At this point, it should be noted that the system, specifically telephone circuitry 395, is instructed by the program to be receptive to the caller's answering touch-tone input right after every query has started. This affords a "dial-through" capability with which the caller can respond any time while the query is on. This capability advantageously allows the caller to skip part or whole of the query which may be familiar to the caller.

Continuing the above example where the caller is ready to submit a facsimile of written text, the program proceeds to step 63. Here, the system queries whether after the submission, the caller desires to have the written text read (A) during the same call or (B) in a return call made by the caller after a designated period of time. The caller may press, for example, "1" on the touch-tone telephone to select the option (A) and "2" to select the option (B). The selection of the option (B) causes the program to set, as indicated at 65, a delayed retrieval flag which serves as a reminder of such a selection to the program.

From the business point of view, the option (B) or the delayed retrieval option would advantageously avail the system to handle more calls during busy hours, thereby generating more revenue for the corporation. The incentive for users to select (B) over (A) is naturally charging such users at a comparatively low rate.

At this point, the program proceeds to step 67 whether from step 65 if (B) was selected or directly from step 63 if (A) was selected. At this step, reading service program 34b causes SS/T card 39 to deliver to the caller a message to the effect that (1) the caller can now submit his/her facsimile by first placing the written material in the input tray of the caller's facsimile machine and second pressing the "START" key on the machine, and (2) more importantly, the caller should not hang-up the phone throughout this call, even, as explained hereinbelow, during the transmission of the facsimile.

To this point, on the caller's end, facsimile machine 6 has been providing a signal path from telephone line 3 directly through facsimile machine 6 to telephone 8. However, responsive to the operation of the "START" key, facsimile machine 6 disconnects telephone 8 from the line and connects the line, instead, to an internal facsimile processing circuitry of the machine.

After a preprogrammed delay to allow the caller to comply with the instruction to operate the "START" key, reading service program 34b instructs facsimile card 37 to now operate switch 371 via switch controller 373 to change from its initial position. This causes facsimile card 37 to seize control of the active, already established telephone connection to the far-end facsimile machine. Thus, at this point, there is a direct telephone connection between facsimile processing circuitry 374 and the facsimile processing circuitry of the caller's facsimile machine 6.

Facsimile card 37 now negotiates with facsimile machine 6, in the standard way, such parameters as line speed, transmission protocols and transmitter/receiver identity. Upon successful completion of these negotiations, as indicated at 69, the caller's facsimile images are transmitted from facsimile machine 6 to facsimile card 37 via telephone network 60, using standard facsimile protocols such as CCITT Group III Compression Scheme.

Once the transmission of the images ends, facsimile machine 6 sends, in a conventional manner, signals indicative of the termination of this transmission to facsimile card 37. In response to a particular one of these signals, namely, the end of facsimile procedure (EEP) signal, switch controller 373 within card 37 triggers switch 371 to change its position. Accordingly, switch 371 switches so as to connect SS/T card 39 back to telephone line 36.

Upon the termination of the transmission, the caller's facsimile machine 6 disconnects the internal facsimile processing circuitry from telephone line 3 and connects the line back to telephone 8. This being so, there is, once again, a direct telephone connection between telephone circuitry 395 of card 39 and telephone 8 through the telephone network. If at this moment telephone 8 had been on hook, the call would have been disconnected. Thus, the aforementioned instruction—requesting the caller not to hang up the phone even during the transmission of the facsimile—is to ensure that the call would not be disconnected at this point. Now, facsimile machine 6 normally emits a beeping noise indicating to the caller the end of the facsimile transmission. This being so, reading service program 34b instructs SS/T card 39 to send out a message which asks the caller to press the 'STOP' key on his/her facsimile machine to terminate the beeping noise.

Facsimile processing circuitry 374 in facsimile card 37 now converts, in accordance with the negotiated parameters, the received facsimile images to a standard bit-mapped form and creates a file that contains the resulting bit maps. As indicated at 71, reading service program 34b instructs the operating system to transport the image bit-map file via bus 21 to hard disk 33 where it is buffered at 33b.

OCR processing circuitry 381 within OCR card 38 is instructed by reading service program 34b at step 72 to read in a copy of the image bit-map file from 33b via bus 21. As indicated at 73, circuitry 381 identifies symbols, for examples, alphabets and punctuation marks, from the respective bit maps in the image bit-map file in a conventional manner. The identified symbols are translated into their associated ASCII characters in a file. As indicated at 75, the resulting translated ASCII file is transported via bus 21 to hard disk 33 wherein the file is stored in memory sector 33c specifically allocated to the caller. Immediately thereafter, the program registers the address of that memory sector along with the caller's identification and password in the caller's personal record. This facilitates retrieval of the translated ASCII file for reading thereof when requested by the caller later on.

Reading service program 34b now checks, as indicated at step 77, whether the delayed retrieval flag was set. Let us assume, now, that it was. Accordingly, the program proceeds to step 81 and calculates when is less busy for the system to read to the caller. This calculation may be based on, for example, the calling-time pattern of callers who utilize this service. Once the calculation is done, the result is delivered to SS/T card 39 which announces to the caller, as indicated at 83, an appropriate time to call back for his/her facsimile reading.

The program thence proceeds to aforementioned step 61. At this point, by touching "1" on telephone 8, the caller can submit more facsimiles more to the system as described hereinbefore. In particular, the caller now desires to have this set of facsimiles, unlike the last set that was submitted, read immediately. In addition, by touching "3" on telephone 8, the caller can terminate the present call. Furthermore, by touching "2" on telephone 8, the program causes the operating system to retrieve from the hard disk the caller's current translated ASCII file as indicated at step 85, which is described in further detail hereinbelow. Thereafter, the system reads to the caller the content of the current translated ASCII file. At this point, because that file contains the material just submitted by the caller at aforementioned step 67, the caller in effect revokes his/her previous choice of having the material read at a later time, and, instead, demands to have it read immediately. This revocation may be due to, in particular, an inconvenient call-back time suggested by the system to the caller for the deferred reading.

Returning, now to step 77, let us assume that the delayed retrieval flag was not set. That is, the caller desired an immediate reading of his/her facsimile. To this end, reading service program 34b thence proceeds to step 85. Here, the program looks up in the caller's personal record the memory address at which the current translated ASCII file is stored for the caller. The program thereupon instructs operating system 34a of FIG. 1 to retrieve from 33c the caller's file with that address. Before the program instructs same to route the file via bus 21 to speech synthesizer circuitry 394 as indicated at 87, it screens the file for a reason to be explained. Circuitry 394 first converts the information in the screened file which is coded in ASCII characters to phonemes, then to a set of time-varying speech parameters indicative of, for example, the amplitudes and fundamental frequencies of the phonemes. Second, it organizes these parameters into a digital bit stream which drives a signal processor (not shown) in circuitry 394. This signal processor generates an analog signal, which represents the speech version of the content of the submitted facsimile, to drive telephone circuitry 395. The latter transmits standard line signals representing the speech to the caller via the already established telephone connection. Thus, the caller on the other end of the telephone network can now listen to the reading of his/her submitted material.

Occasionally, the written material submitted to the system contains graphics that are comprised of non-alphabets. Accordingly, OCR processing circuitry 381 would translate the graphics into a string of non-alphabetic ASCII characters, responsive to which speech synthesizer circuitry 394 would generate unintelligent speech. This being so, the aforementioned screening by the program is designed to identify such strings and replace them with a predetermined string of ASCII characters. The replacement causes the speech synthesizer circuitry 394 to generate a predetermined message to inform the caller of this situation. Illustratively, this message may be "The current line is unreadable."

As the caller is listening to the reading generated from the system, he/she may modify the speech generating conditions by pressing appropriate keys on touch-tone phone 8. Illustratively, pressing "1" enables the caller to stop the speech, "2" to restart the speech, "3" to speed up the speech, "4" to slow down the speech, "5" to toggle between spell mode and read mode, "6" to repeat from the begining of the sentence and "7" to repeat from the begining of the submitted text.

To this end, telephone circuitry 395 is instructed as shown at step 89 to be receptive to the caller's touch-tone inputs as the speech modification commands. The above-described speech modification capabilities are built into speech synthesizer circuitry 394 in SS/T card 39. In the present illustrative embodiment, an operating software is supplied by the vendor—Speech Plus Incorporated—to operate the card. Included in the software are subroutines which can be invoked to implement the associated speech modification capabilities. Reading service program 34b incorporates such an operating software. This being so, upon receiving a touch tone indicative of a user's request for a particular speech modification from telephone circuitry 395, reading service program 34b invokes the appropriate subroutine to realize that particular modification. For example, in response to the caller's request for temporarily stopping the ongoing speech, the program proceeds to step 91a where the associated subroutine is invoked. As a result, the speech is halted. Thereafter, the program proceeds to step 89 where the program waits for the next command, which in this instance is presumably a request for resumption of the speech. If indeed so requested, the program proceeds to step 91b to restart the speech. After the command is met, program 34b advances to step 92 which is described hereinbelow.

Other speech modifications can also be accomplished by the above-described routine once they are requested by the caller. In particular, reading service program 34b can increase the speed of the speech as indicated at 91c. Specifically, in response to each successive touch tone of "3" generated by the caller, the current speech would run faster by a predetermined increment, thereby allowing the caller to adjust the speed to his/her liking. The program can also perform at step 91d the inverse function to the speed-up capability. That is, on receiving each successive touch tone of "4", the program causes the speech to slow down by a predetermined decrement. In addition, the present facsimile reading service provides spell mode/read mode capability as indicated at 91e. Triggered by touch tone of "5" from the caller, reading service program 34b causes speech synthesizer circuitry 394 to toggle between the normal read mode and the spell mode, wherein individual words are spelled, as opposed to read, to the caller. Furthermore, touch tones of "6" and "7" initiate the program to, respectively, steps 91f and 91g. At 91f, circuitry 394 is instructed to repeat the speech from the beginning of the last sentence and at 91g to repeat from the beginning of the submitted text, instead. Of course, other processing capabilities, for example, last-word repeat, that are possibly appreciated by the user can also be incorporated at this point in the present facsimile reading service.

After responding to a particular one of commands at 91b through *g*, reading service program 34b proceeds to step 92 to check whether it has finished reading the translated ASCII file. If not, the program loops back to step 87 where additional ASCII characters are retrieved from the file so as to maintain a continuous flow of speech. Otherwise, if the file is finished, the caller is again availed of the menu of submitting, retrieving or ending at step 61, which is fully described hereinbefore.

For sake of completeness, it is worth mentioning, although apparent at this point, how reading service program 34b services a caller who chose deferred reading of his/her submitted text in a prior telephone session. The caller now calls system 10 back at the suggested time. Accordingly, the latter picks up the call, opens the caller's personal record, and validates his/her entry in the above-described mechanism. This brings reading service program 34b to step 61 at which the caller should now choose option (2). The program responsively proceeds to step 85 where it retrieves from hard disk 33 the caller's translated ASCII file associated with the previously submitted text. This retrieval is made possible using the memory address which was registered in the caller's personal record in the prior telephone session. Once that file is retrieved from that address, the program proceeds to read to the caller the content of the previously submitted text in a manner which is fully described hereinbefore.

Figure 4:
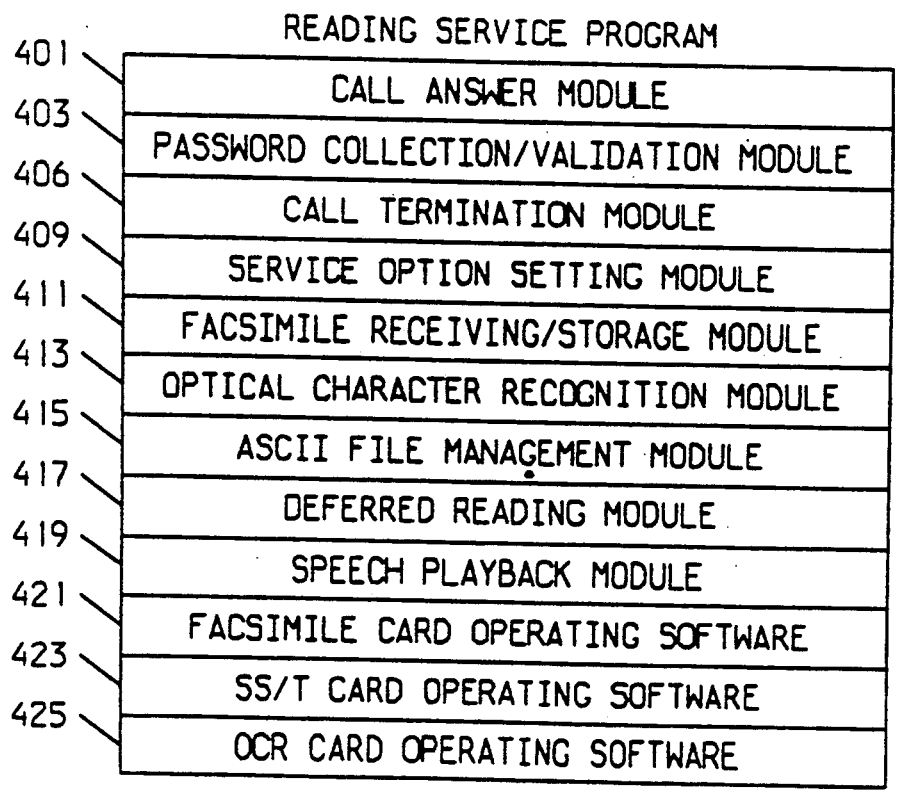
FIG. 4 is a memory map of a region of the hard disk used in the system of FIG. 1.

FIG. 4 is a memory map of the region of hard disk 33 that holds the "permanent" copy of the reading service program, denoted 33e, as previously discussed. As shown therein, the program includes a number of identifiable modules, copies of which comprise the executing copy of the program stored at 34b of RAM 34. The principal functions of these modules are as follows:

| Module Name and Number | Principal Function and Corresponding Flowchart Steps |
|---|---|
| Call Answwer 401 | initial telephone call processing (step 50) |
| Password Collection/Validation 403 | obtaining and verifying caller's password (53, 55) |
| Call Termination 406 | disconnecting call (57, 59) |
| Service Option Setting 409 | specifying reading service options (61, 63, 65) |
| Facsimile Receiving/Storage 411 | receiving from caller facsimiles and storing the information thereof in image bit-map file (67, 69, 71) |
| Optical Character Recognition 413 | reading in image bit-map file and translating the content thereof into a file of ASCII characters (72, 73) |
| ASCII File Management 415 | storing and retrieving translated ASCII file (75, 85) |
| Deferred Reading 417 | informing caller of appropriate time to call back for deferred reading (77, 81, 83) |
| Speech Playback 419 | reading to caller the content of submitted facsimiles (87, 78, 91 a through g, 92) |

Three other modules within the reading service program are facsimile card operating software 421, the aforementioned SS/T card operating software 423 and OCR card operating software 425. These modules are supplied by the vendors of the cards themselves and control the card hardware in response to commands from the above-listed software modules. And it will, of course, be appreciated that the executing copy of the reading service program in RAM 34 is comprised of copies of the modules shown in FIG. 4.

It will be appreciated that those skilled in the art will be able to devise numerous arrangements which, although not explicitly shown or described herein, embody the principles of the invention and are within its spirit and scope.

For example, although the invention has been disclosed in the context of a particular hardware/software configuration, other such configurations providing the same functionality may be used.

In addition, in the disclosed embodiment, the caller is required to key in his/her password in order to enter the facsimile reading service. This may create some trouble to visually impaired persons. As an alternative to this security provision, it may be desirable to have the system return a service call to a caller after his/her initial service request call. Before returning the call, the system may, for example, verify the caller's originating telephone number provided at the initial call by checking it against a list of authorized ones. One way this verification is possible is if the service is deployed in an ISDN (Integrated Services Digital Network) environment. Such an environment can provide a called party, in this case the facsimile reading service, with the telephone number of the calling party, which in this application is the visually impaired person.

Furthermore, although the caller inputs are illustratively provided via the operation of the keys of a touchtone telephone, it may be desirable to provide the system with, for example, voice recognition circuitry which allows the caller to provide spoken inputs instead.

Finally, although the presently disclosed system maintains the image and translated ASCII files in local storage, it may be desired—particularly if there is a large base of users—to store that information on a larger system and have the local system, i.e., the system interacting with the caller, request and have the information downloaded when it is needed. As in other straightforward variations, the system may be configured to handle multiple calls and reading requests on a time-shared or parallel processing basis.

I claim:

1. A method for providing a service for reading of written text, said method comprising the steps of
   receiving from a caller said written text via a facsimile machine over a telephone network, and
   scanning said text utilizing an optical character recognition technique to identify symbols of said written text, the identified symbols being read to said caller in a synthesized voice over said telephone network.

2. The method of claim 1 wherein said identified symbols are read to said caller upon a call back from said caller to said service.

3. The method of claim 1 wherein said reading of written text can be stopped and restarted at the control of said caller.

4. The method of claim 1 wherein the identified symbols being read are individual alphanumeric characters.

5. The method of claim 1 wherein the identified symbols being read are words corresponding to individual identified symbols of said written text.

6. The method of claim 1 wherein the reading of said identified symbols can be performed with a plurality of reading speeds.

7. The method of claim 6 wherein individual ones of said plurality of reading speeds are selectable by said caller.

8. The method of claim 1 wherein the content of said written text comprises a plurality of sentences and the reading of the symbols of the written text including the step of stopping the reading of symbols corresponding to a first sentence of said written text to repeat the symbols corresponding to another sentence preceding the symbols of said first sentence.

9. The method of claim 1 wherein the reading of the identified symbols includes repeating the reading of the identified symbols corresponding to the content of said written text.

10. The method of claim 1 wherein said method further comprises the step of establishing a telephone connection between said caller and said service via said telephone network.

11. The method of claim 10 wherein said telephone connection is established when said service returns a call to said caller after receiving a service request from said caller.

12. The method of claim 10 wherein said identified symbols are read to said caller over said telephone connection.

13. A computer-based system for providing a service for reading of written text, said system comprising
- first circuit means for receiving from a caller said written text via a facsimile machine over a telephone network,
- second circuit means responsive to the received written text facsimile for scanning said text utilizing an optical character recognition technique, and
- third circuit means for reading to said caller in a synthesized voice the content of the scanned written text over said telephone network.

14. The system of claim 1 wherein said third circuit means performs said reading upon a callback from said caller to said system.

15. The system of claim 13 wherein said third circuit means performs said reading with a plurality of reading speeds.

16. The system of claim 15 wherein individual ones of said plurality of reading speeds are selectable by said caller.

17. The system of claim 13 wherein the content of said written text comprises alphanumeric characters and said second circuit means provides a capability of reading the alphanumeric characters to said caller.

18. The system of claim 13 wherein said third circuit means provides a capability of repeating the reading of the content of said written text.

19. The system of claim 13 wherein the content of said written text comprises alphanumeric characters and said third circuit means provides a capability of stopping the reading of a first sentence of said written text to repeat another sentence preceding said first sentence.

20. The system of claim 13 wherein the content of said written text comprises alphanumeric characters and said third circuit means provides a capability of reading individual words corresponding to the alphanumeric characters.

21. The system of claim 13 wherein said system further comprises fourth circuit means for establishing a telephone connection between said caller and said service via said telephone network.

22. The system of claim 21 wherein said third circuit means performs said reading over said telephone connection.

23. The system of claim 21 wherein said telephone connection is established when said service calls said caller after receiving a service request from said caller.

* * * * *